(12) United States Patent
Williams

(10) Patent No.: US 10,116,139 B2
(45) Date of Patent: Oct. 30, 2018

(54) SOLAR POWER LIGHTED AUDIO FISHING TACKLE BOX

(71) Applicant: Daniel Williams, Aurora, IL (US)

(72) Inventor: Daniel Williams, Aurora, IL (US)

( * ) Notice: Subject to any disclaimer, the term of this patent is extended or adjusted under 35 U.S.C. 154(b) by 440 days.

(21) Appl. No.: 14/882,197

(22) Filed: Oct. 13, 2015

(65) Prior Publication Data

US 2017/0104335 A1 Apr. 13, 2017

(51) Int. Cl.
*H02J 3/00* (2006.01)
*H02J 3/38* (2006.01)
*H02J 7/35* (2006.01)
*H04R 5/02* (2006.01)
*F21V 33/00* (2006.01)
*A01K 97/06* (2006.01)
*F21S 9/03* (2006.01)
*H04R 1/02* (2006.01)
*H04R 5/04* (2006.01)
*F21Y 115/10* (2016.01)

(52) U.S. Cl.
CPC .............. *H02J 3/383* (2013.01); *A01K 97/06* (2013.01); *F21S 9/03* (2013.01); *F21V 33/008* (2013.01); *H02J 7/35* (2013.01); *H04R 5/02* (2013.01); *F21Y 2115/10* (2016.08); *H04R 1/028* (2013.01); *H04R 5/04* (2013.01); *H04R 2201/025* (2013.01); *H04R 2420/07* (2013.01)

(58) Field of Classification Search
CPC .......... A01K 97/06; F21S 9/03; F21V 33/008; H02J 3/383; H02J 7/35; H02J 2007/0062; H04R 5/02; H04R 1/028; H04R 2201/025; H04R 2420/07; H04R 5/04; F21Y 2115/10

USPC ........................................................... 307/26
See application file for complete search history.

(56) References Cited

U.S. PATENT DOCUMENTS

| 6,870,089 B1* | 3/2005 | Gray | H01L 31/042 136/200 |
|---|---|---|---|
| 2006/0028820 A1* | 2/2006 | Fitzsimmons | A01K 97/06 362/276 |
| 2008/0031483 A1* | 2/2008 | Hill | F25D 23/12 381/334 |
| 2010/0295376 A1* | 11/2010 | Black | H02J 7/0068 307/80 |
| 2013/0156251 A1* | 6/2013 | Noble | H04R 1/028 381/387 |
| 2014/0341413 A1* | 11/2014 | McKeough | H04R 1/00 381/334 |

* cited by examiner

Primary Examiner — Rexford Barnie
Assistant Examiner — Toan Vu
(74) Attorney, Agent, or Firm — Corridor Law Group, P.C.

(57) ABSTRACT

The present invention relates to a fishing tackle box that has been outfitted with LED (light Emitting Diodes) lighting the trays and main storage areas of the box. The LEDs in the box are powered by a rechargeable battery charged by at least two solar panels, and are positioned to provide power regardless of the box being opened or closed. The battery and solar panels also provide power to a USB connector mounted on the external wall of the box to allow charging of a smartphone or audio device. Also, the box has stereo or two speakers driven by wireless (Bluetooth) wired audio inputs to the box. AC or mains input is located on an external wall of the box for an additional charging source.

4 Claims, 7 Drawing Sheets

SOLAR POWER LIGHTED AUDIO FISHING TACKLE BOX

TECHNICAL FIELD AND BACKGROUND

The present invention relates to a lighted fishing tackle box. The box has LEDs (light emitting diodes) or any other electronic light source that are small enough to mount inside the compartments and trays inside the box and light up the small items in the compartments and trays. Thus the small items are easily found when needed during the variable light levels available while fishing or hunting etc.

Additionally the box includes solar cell panels, battery and charge circuits to power the LEDs under many different conditions. Specifically, solar cells are mounted on both the inside and outside walls of the top lid of the box so that sun light can recharge the battery and power the LEDs regardless of whether the top lid is opened or closed. Circuitry using diodes for example, allow automatic switching of input from solar panel receiving sun light, while blocking current from leaking back to the other dark panel. The solar panel provides a replenishable supply of power from the sun in places in the wild fishing areas were no other power source is available.

Additionally the tackle box uses pairs of stereo speakers mounted on the top walls or lids of the box mounted and isolated inside and out so that when top wall is open or closed they send sound in the correct direction to the fisherman. A switch circuit detects the opening or closed of the lids to turn on speakers pairs in the correct direction. The above feature provides audio entertainment to the fisherman during fishing and travelling times. Specifically, a Bluetooth-receiver/Amplifier module board with battery provides the audio entertainment to drive the speakers from a Bluetooth transmitter or wired Smartphone or audio player audio sources.

Additionally, the replenishable power supplied by the battery and solar panels is used to provide a powered USB outlet mounted on the wall of the box, to recharge the Smartphone or audio player during prolonged fishing trips.

Also, there is no reason that the above features have to be limited to any particular style or shape or size of box. All typical boxes with trays, subtrays, compartments and sub-compartments, that could use individualized lighting are provided with lighting without significant loss of space.

In addition, all electronic connections, electronic circuits and electronic elements are waterproofed by usual or appropriate compounds or materials.

Previous attempts at providing a lighted tackle or toolbox used only batteries as a power source. They had no further power source that was replenishable out in the wilderness were fishing is more often done. The previous attempts did not provide individual lighting elements for each and tray and compartment. Previous attempts also, did not provide audio entertainment or means recharge a Smartphone in the wild away from civilization.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase "generally" does not refer to the same embodiment, however, it may. The terms "comprising", "having" and "including" are synonymous, unless the context dictates otherwise.

Figure 1:
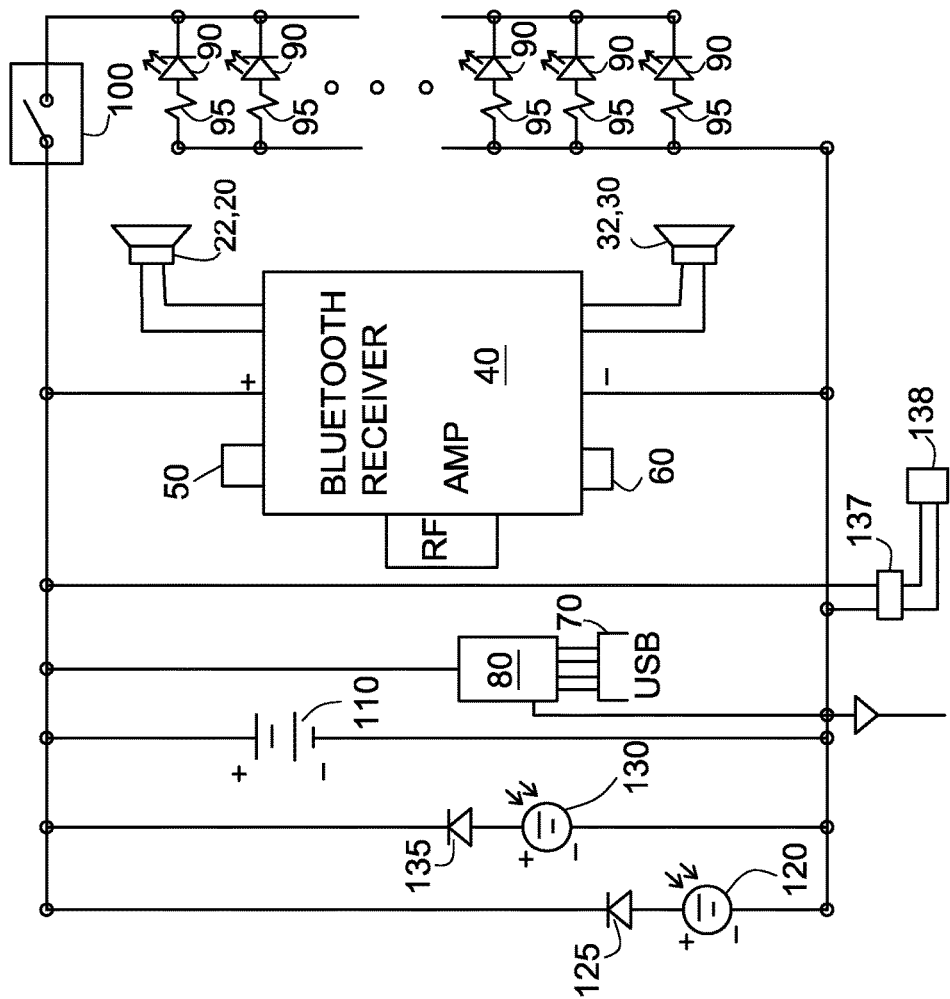
FIG. 1 is a circuit diagram of the present invention.

The embodiment shown in FIG. 1 shows the main circuit or circuits of the present invention that provides the features of lighted 90 trays or compartments, replenishable power supply's 120, 130 for the lights 90 and smartphone or audio player charging 70 and amp/Bluetooth-receiver 40, speakers 20, 30 all mounted in an ordinary (often off the shelf) fishing tackle or tool box.

FIGS. 2-7 illustrate an embodiment or example of possible locations, mountings, size, and styles of circuit elements used in FIG. 1 within and throughout the ordinary fishing tackle box or toolbox.

In FIG. 1, speakers 20 and 30 are connected to speaker outputs of a circuit board 40 having an amplifier and possibly a Bluetooth receiver. The speakers 20 and 30 may be mounted in the top right hand side lid 170 of the box with sound output side cut through the external wall of the right top lid 170 and coils on the inside of the box. This is shown in FIGS. 7, 4, 3 and 2. FIGS. 2, 3, 7 and 4 show how the top lids 170 and 140 are split in two parts via hinges 145 and 175 and latched with clamp 180. In some of FIGS. 7, 4, 3, and 2 additional speakers 22 and 32 are shown which are the speakers used when the tackle box is open and speakers 20 and 30 are positioned in the wrong direction. Speakers 22 and 32 would be magnetically isolated from speakers 20 and 30 as necessary. An electronic circuit or switch (not shown) would detect the opening and closing of the top right hand side lid 170, so that the appropriate pairs of speakers 20, 30, 22, and 32 would be active. FIG. 4 in this embodiment shows that the speakers 20 and 30 where mounted in former drink holders of the box.

Figure 2:
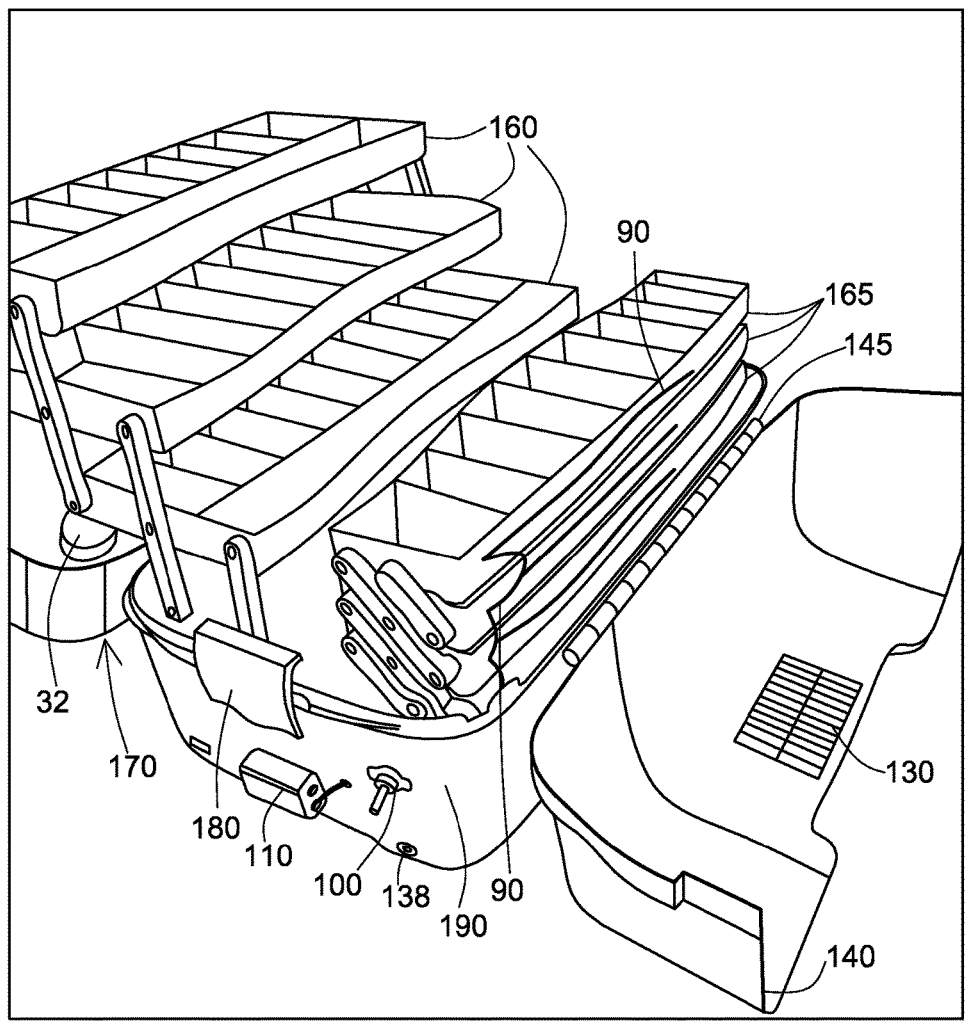
FIG. 2 is a right oriented view of a typical fishing box outfitted with the system of the present invention.
Figure 3:
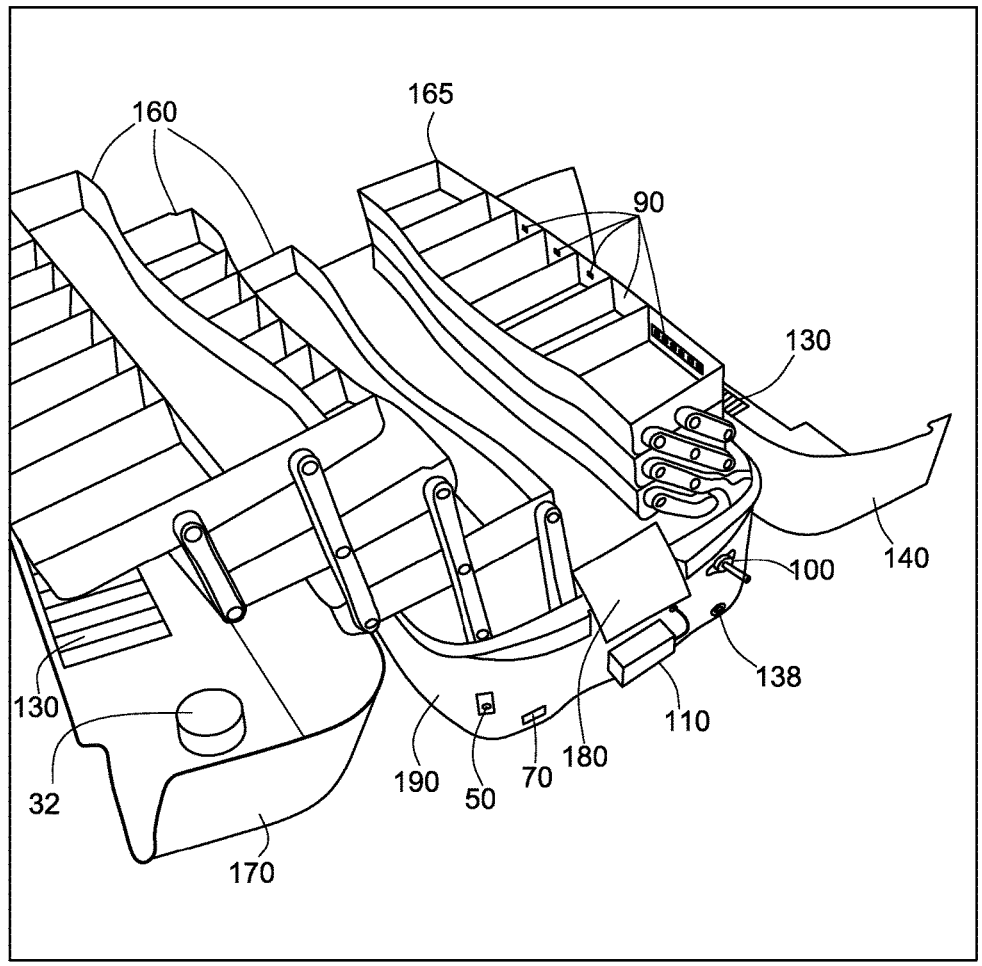
FIG. 3 is a left oriented view of a typical fishing box outfitted with the system of the present invention.
Figure 4:
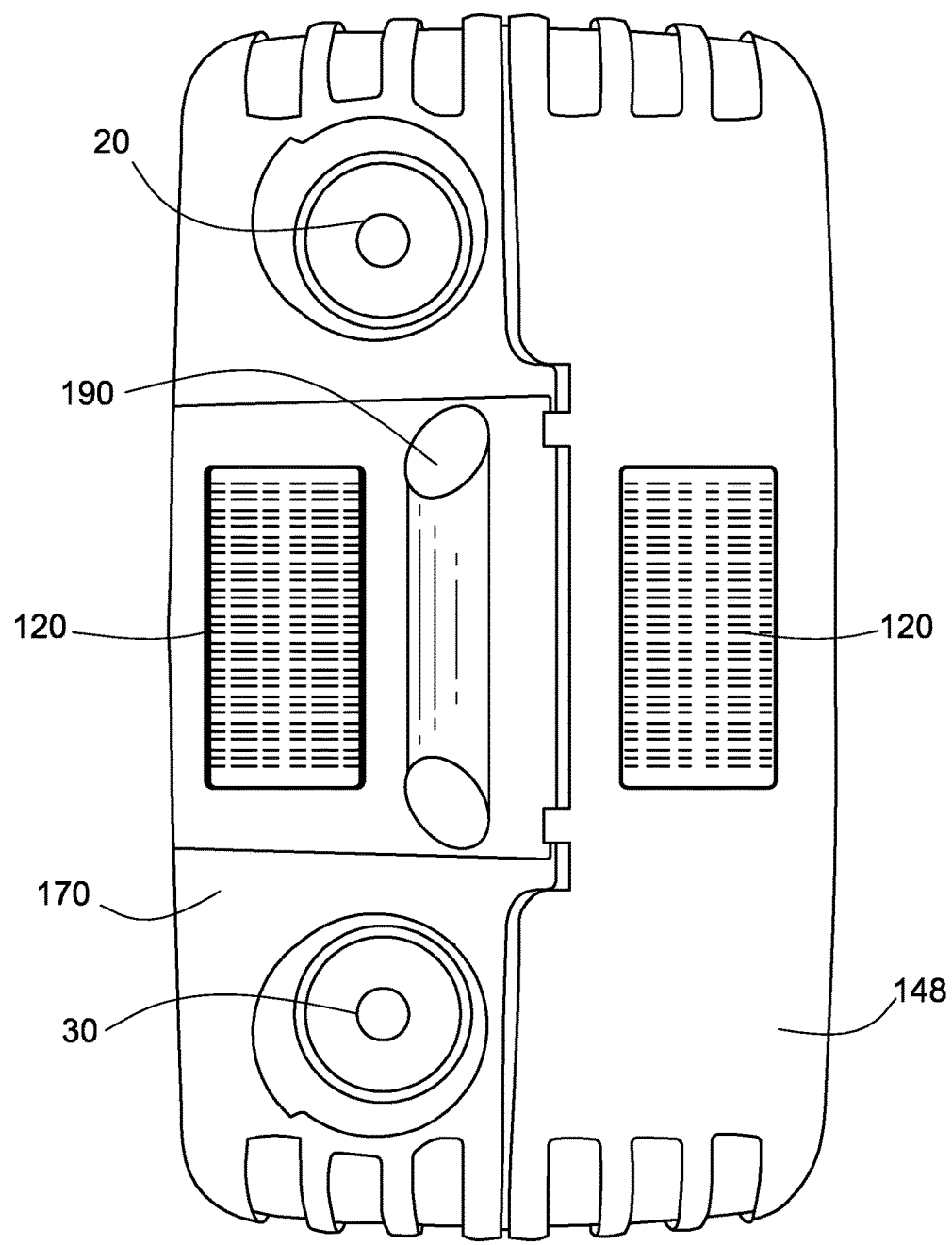
FIG. 4 is a view of the top of tackle box outfitted with the elements of the system of the present invention.
Figure 5:
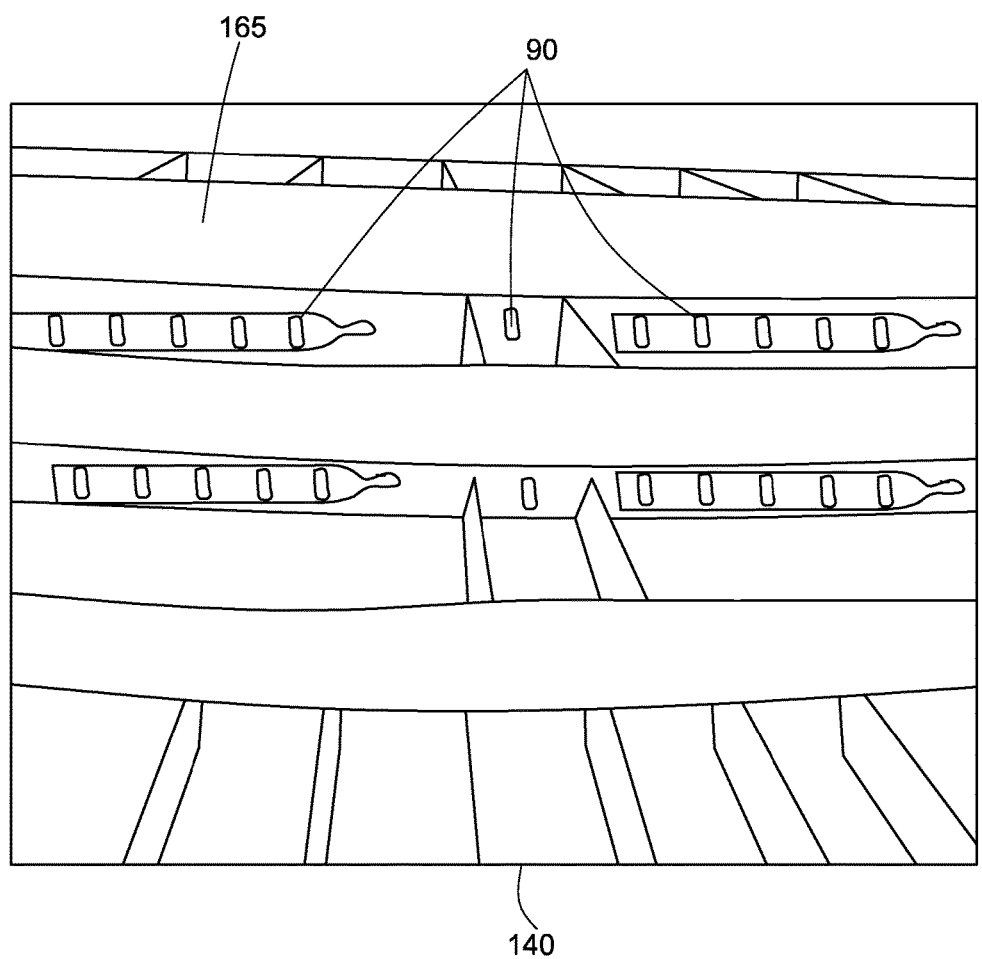
FIG. 5 is a close-up view of the LEDs arranged in the individual trays and compartments of the present invention.
Figure 6:
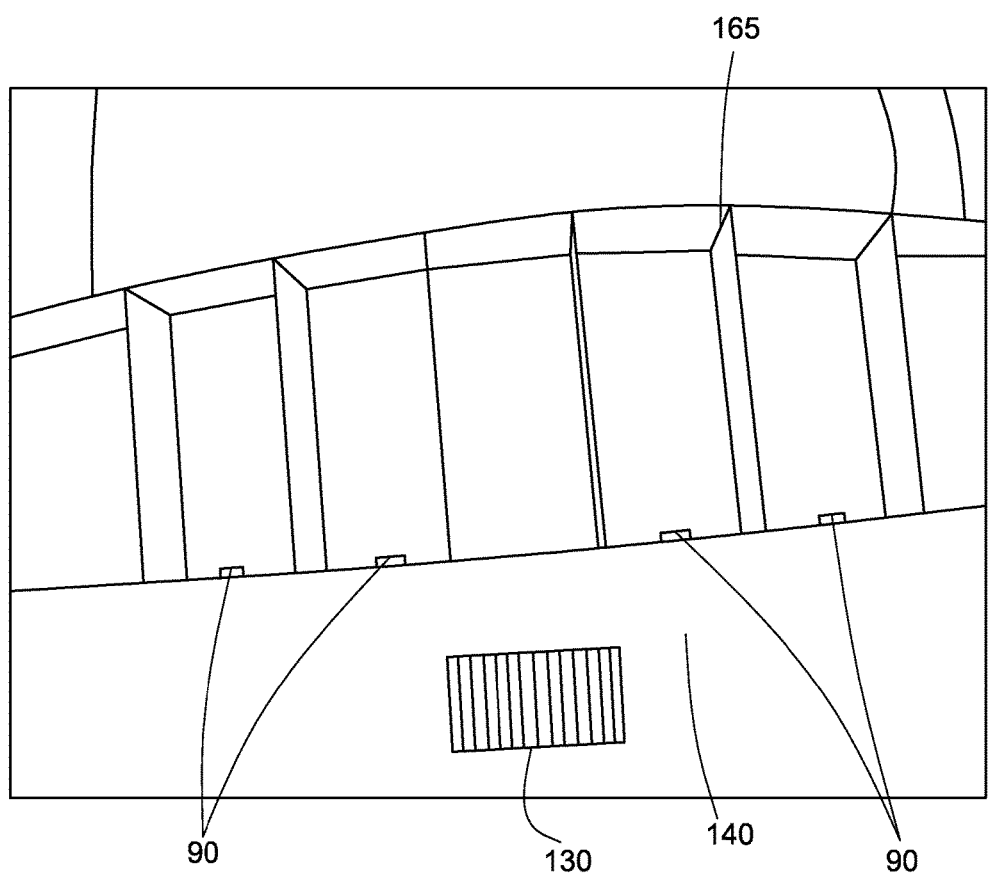
FIG. 6 is another close-up view of the LEDs arranged in the individual trays and compartments of the present invention.
Figure 7:
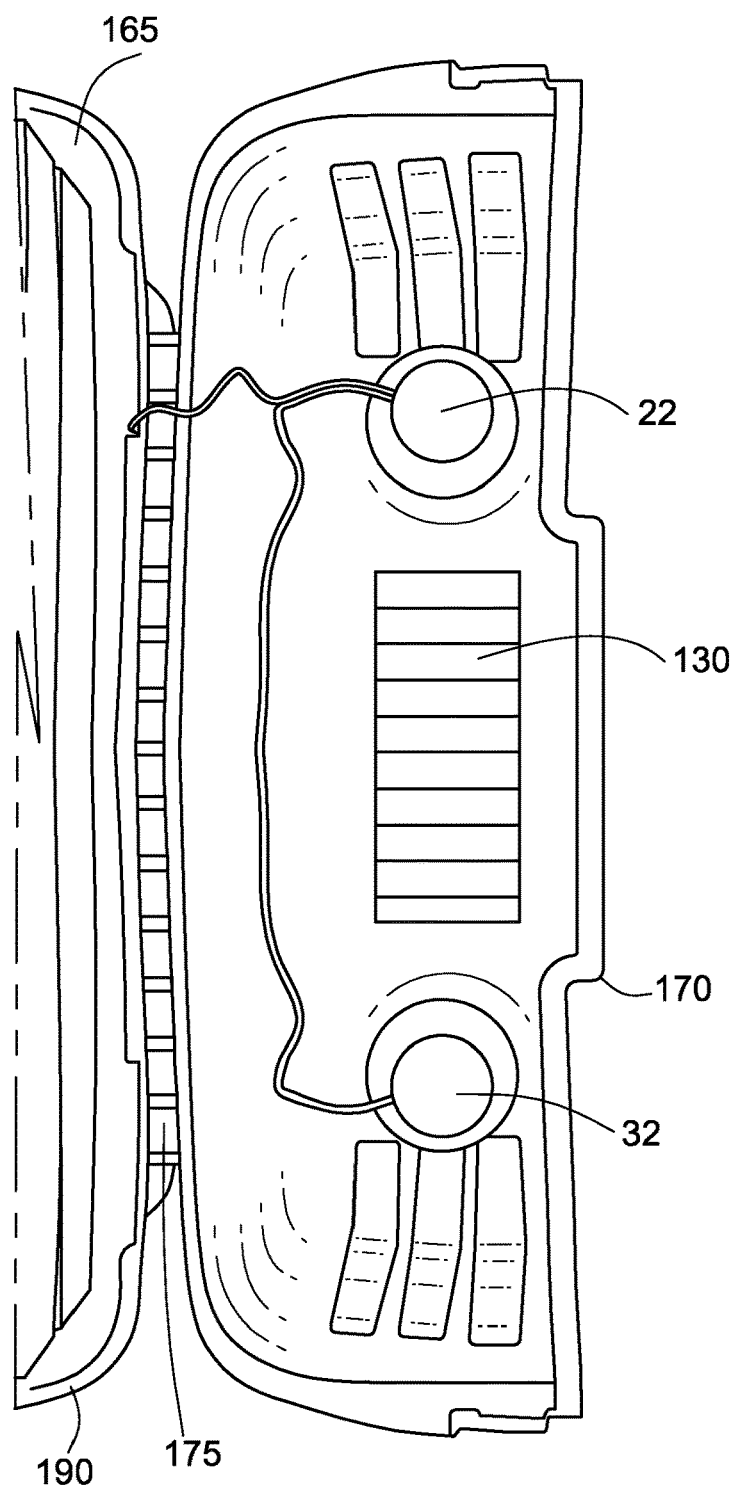
FIG. 7 is a close up view of opened right hand side of top of the box outfitted with elements of the system of the present invention.

The circuit board 40 may have a line-in port 50 and USB port 60, that can be mounted in the lower portion of the external wall of the bottom portion 190 of the box in FIGS. 2 and 3. Therefore, the circuit board 40 may be mounted on the inside bottom wall of the lower portion 190 of the box. The mounting of circuit board 40 may include mounting one of its connectors to the external wall of the box at 190 or may not in the instance, when the Bluetooth receiver on the board 40 connects to a Bluetooth transmitter on the smartphone or external audio source.

Circuit board 40 may often have a rechargeable battery 10 charged by an external power source usually from USB or USB port 60 or 70, but in this case provided by power from the battery 110 and solar cell pairs 120 and 130 connected in parallel. Either or both USB ports 60 or 70 and rechargeable battery 110 maybe mounted in this embodiment, on outside external wall of bottom portion 190 shown in FIGS. 2 and 3.

USB port 70 may have circuitry 80 used to provide a resistor divider circuit connected between USB data pins power pins, so that when USB port 70 is used as a port to charge smartphones all smartphones may charge from port 70 even if some use voltage pull up resistors on the data pins to put themselves into the charge mode. Apple iPhones for example, require such charge mode activation.

Solar panel parallel pairs 120 and 130 are provided to power the recharge battery 110 and primarily power the LEDs 90, the circuit board 40, and powering the charge of a smartphone though port 70. In this embodiment, the battery 110 provides power to the same devices as the solar panel pairs 120 and 130 at the same time being charged in order smooth out the natural highs and lows of power from panels 120 and 130 caused by temporary random lack of sun light. Two solar panels instead of just one are not necessarily needed because of the power requirements, but so that one panel 130 can be mounted upward towards the sun light and receiving the sunlight on the inside wall of the right hand side 140 top lid when it is opened FIG. 3. The solar panel 120 then is mounted on the outside wall of the same right and left hand side 140 top lid so that it receives sunlight only when the lid 140 is closed as in FIG. 4. In FIG. 4, solar panel pairs 130 on the inside lids or exposures will be dark since the whole box is closed. In FIG. 3, solar panels 120 will be dark or mostly dark when the top lid faces downward to the ground or boat bottom or seat or table when the top lids are open. The diodes 125 and 135 are in series with panel pairs 120 and 130, while the combination of the panel pairs 120 and diode 125 are in parallel with panel 130 and diode 135. The above diode-panel circuits use the diodes 125, 135 to prevent current supplied by the sun lit panel from leaking back into the dark panel. Also, when opening or closing the box they both receive various amounts of sunlight between light and dark, then the diode-panel circuits help supply two combined currents.

An AC/DC adaptor plugged in to connector 138, shown in FIGS. 1, 2 and 3, provides power to recharge battery 110 and maybe battery 10 when there is no sunlight and AC main power is more available when not fishing. FIGS. 2 and 3 show the mounted location for connector 138 on bottom portion 190. A charge circuit or simple diode 137 might be included.

Switch 100 is mounted on bottom portion 190 in FIGS. 2 and 3, to provide on/off selection-application of power to LEDs 90 as shown in FIG. 1. Resistors 95 are included in series with each LEDs 90 to properly forward bias (turn on) each LED 90. The resistors 95 and LEDs 90 are mounted in as many as possible of the individual trays and compartments 160 and 165 inside the box. See FIGS. 2, 3, 5 and 6.

As shown in FIG. 3, LEDs 90 can be of the single discrete type mounted in the smallest compartments whereas LEDs 90 can be a plurality of LEDs and bias resistors of the smaller flatter type mounted on a flat surface or substrate or tape. Thus, LEDs used are of a size appropriate to the size of the compartment.

In addition, all electronic connections, electronic circuits and electronic elements are waterproofed by appropriate compounds or materials.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

What is claimed is:

1. A tackle box having electronic circuitry, electronic power sources for support of lighting, audio, and audio source, comprising:
   first and second compartments, wherein said first compartment is smaller in volume than said second compartment,
   a battery and an AC/DC main power input for providing a DC power source,
   a plurality of solar panels, wherein the plurality of solar panels are mounted, located and positioned on and in the box and connected in the power circuit in a manner that some face the sun to provide DC power while the box is open while others face the sun to provide DC power while the box is closed,
   a plurality of low power miniature lights mounted in said first compartment and said second compartment of said box and connected through a switch to said DC power source,
   an amplifier circuit mounted in said box and connected to said DC power source and to an external source of audio,
   a plurality of speakers mounted on or in said box and connected to said amplifier circuit to provide amplified audio output from said external source of audio,
   a connector connected to said input of said AC/DC power and mounted on a wall of said box to provide charging power to said battery and to provide substitute power to said DC power source.

2. A tackle box having electronic circuitry, electronic power sources for support of lighting, audio, and audio source, comprising:
   first and second compartments, wherein said first compartment is smaller in volume than said second compartment, a plurality of solar panels, a battery, an AC/DC main power input for providing DC power source, a plurality of low power miniature lights mounted in said first compartment and said second compartment of said box and connected through a switch to said DC power source,
   an amplifier circuit mounted in said box and connected to said DC power source and to an external source of audio,
   a plurality of speakers mounted on or in said box and connected to said amplifier circuit to provide amplified audio output from said external source of audio, a connector connected to said input of said AC/DC power and mounted on a wall of said box to provide charging power to said battery and to provide substitute power to said DC power source, and wherein the plurality solar panels are mounted, located and positioned on and in the box and connected in the power circuit in a manner that some face the sun to provide DC power while the box is open while others face the sun to provide DC power while the box is closed.

3. A tackle box having electronic circuitry, electronic power sources for support of lighting, audio, and smartphone, comprising:

first and second compartments, wherein said first compartment is smaller in volume than said second compartment, a plurality of solar panels, battery and an AC/DC main power input for providing DC power source, a plurality of low power LEDs mounted in said first compartment and said second compartment of said box and connected thru a switch to said DC power source, an amplifier circuit mounted in said box and connected to said DC power source and to an external source of audio, a plurality of speakers mounted on or in said box and connected to said amplifier circuit to provide amplified audio output from said external source of audio, a connector connected to said input of said AC/DC power and mounted on a wall of said box to provide charging power to said battery and to provide substitute power to said DC power source, and wherein the plurality solar panels are mounted, located and positioned on and in the box and connected in the power circuit in a manner that some face the sun to provide DC power while the box is open while others face the sun to provide DC power while the box is closed, and wherein the plurality speakers are mounted, located and positioned on and in the box and connected in the circuit in a manner that some provide direct sound waves while the box is open while others provide DC power direct sound waves while the box is closed.

4. A tackle box of claim 3 wherein said LEDs are single discrete LEDs for said first compartment.

\* \* \* \* \*